(12) United States Patent
Glovatsky et al.

(10) Patent No.: US 7,102,888 B2
(45) Date of Patent: Sep. 5, 2006

(54) ELECTRONICALLY INTEGRATED VEHICLE STRUCTURE

(75) Inventors: Andrew Z. Glovatsky, Plymouth, MI (US); Jay D. Baker, West Bloomfield, MI (US); Richard Keith McMillan, Dearborn, MI (US); Myron Lemecha, Dearborn, MI (US); Daniel Roger Vander Sluis, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 326 days.

(21) Appl. No.: 10/828,396

(22) Filed: Apr. 20, 2004

(65) Prior Publication Data

US 2005/0231907 A1 Oct. 20, 2005

(51) Int. Cl.
*H05K 7/20* (2006.01)
*B62D 25/14* (2006.01)

(52) U.S. Cl. ............ 361/695; 361/690; 361/694; 296/70; 296/208

(58) Field of Classification Search ......... 361/690, 361/694–695, 717–720; 296/70, 192, 208; 454/184–186
See application file for complete search history.

(56) References Cited

U.S. PATENT DOCUMENTS

| | | | | |
|---|---|---|---|---|
| 4,750,087 | A | * | 6/1988 | Carpenter et al. ......... 361/690 |
| 5,669,813 | A | * | 9/1997 | Jairazbhoy et al. ......... 454/69 |
| 5,706,170 | A | * | 1/1998 | Glovatsky et al. ......... 361/695 |
| 5,712,764 | A | | 1/1998 | Baker et al. |
| 5,715,140 | A | | 2/1998 | Sinkunas et al. |
| 5,856,908 | A | * | 1/1999 | Takiguchi et al. ......... 361/690 |
| 5,979,540 | A | * | 11/1999 | Allison et al. ............. 165/41 |
| 6,257,897 | B1 | | 7/2001 | Kubota |
| 6,474,716 | B1 | | 11/2002 | Shikata et al. |
| 6,505,876 | B1 | | 1/2003 | Watanabe |
| 6,611,429 | B1 | | 8/2003 | Kline et al. |
| 6,669,273 | B1 | | 12/2003 | Glovatsky et al. |
| 7,000,969 | B1 | * | 2/2006 | Baker et al. ............... 296/70 |

FOREIGN PATENT DOCUMENTS

WO        WO 03/063300 A1 *  7/2003

* cited by examiner

*Primary Examiner*—Lynn Feild
*Assistant Examiner*—Robert J. Hoffberg
(74) *Attorney, Agent, or Firm*—Brinks Hofer Gilson & Lione (57) ABSTRACT

An integrated vehicle structure includes an electronic site in a plastic support structure. The electronic site has a flexible substrate with electronic components mounted thereon. The plastic support structure defines a plastic mounting surface which includes a plurality of elongated ribs projecting from the plastic support structure. Each of the ribs have a side edge forming a portion of the plastic mounting surface. The flexible substrate is mounted to the plastic mounting surface, and a plurality of air flow passageways are defined by adjacent ribs in the flexible substrate. A method support structure may also be provided which defines a metal mounting surface. One or more electronic sides may be attached to the metal and plastic mounting surfaces.

31 Claims, 6 Drawing Sheets

ELECTRONICALLY INTEGRATED VEHICLE STRUCTURE

FIELD OF THE INVENTION

The present invention relates generally to electrical interconnection of electronic components of a vehicle, and more particularly relates to integration of electronic sites into the vehicle support structure.

BACKGROUND OF THE INVENTION

Typically, vehicles house a plurality of electronic components which must be properly wired. For example, instrument panels typically include instrument cluster gages, air-conditioning controls, radios, navigation systems, lighters, airbags, reading lights, and other similar devices. Generally, these electronic components each include their own housing, which is typically a large metal or plastic box. These boxes or housings provide structural support to the electrical devices and modular mounting within the vehicle. Further, the boxes may also include the provision of a human machine interface (HMI) such as the control for the radio or the like.

All of these electronic devices must be provided with power and signal lines which is typically accomplished by a wire harness positioned within the vehicle, typically packaged within the instrument panel. Usually, a wire harness is made with a plurality of pigtails having an electrical connector disposed at one end for connection to an electrical device such as one referenced above. Unfortunately, as the electronic devices increase in the instrument panel, so does the complexity of the wire harness. The complexity of the wire harness, as well as the large size and weight of the boxes housing the components, lead to larger assembly cost, weight and difficulty in packaging.

U.S. patent application Ser. No. 10/292,553, commonly owned by the assignee and incorporated herein by reference in its entirety, discloses a unique solution to these problems using flatwire to electronically integrate the wiring and components into the vehicle support structure. Nonetheless, unique packaging issues remain in finding available area for mounting the electronics and providing adequate cooling of the components.

Accordingly, there exists a need for an electrical interconnection solution for the electronic devices of a vehicle that is easy to assemble and minimizes the size and weight of the whole system, while still providing adequate space, mechanical support, and thermal cooling of the electronic devices.

BRIEF SUMMARY OF THE INVENTION

The present invention provides an integrated vehicle structure comprising an electronic site having a flexible substrate with electronic components mounted on the flexible substrate. A plastic support structure defines a plastic mounting surface. The plastic support structure includes a plurality of elongated ribs projecting from the plastic support structure and extending along side each other. Each of the ribs has a side edge forming a portion of the plastic mounting surface. The flexible substrate is mounted to the plastic mounting surface. A plurality of air flow passageways are defined by adjacent ribs and the flexible substrate mounted to the adjacent ribs. The plurality of air flow passageways extend along the plastic support structure to provide convective cooling to the electronic components of the electronic site.

According to more detailed aspects, the plastic mounting surface is vertically oriented, and the air flow passageways extend vertically. The ribs and air flow passageways preferably extend from an upper end of the plastic mounting surface to a lower end of the plastic mounting surface. In this way, the air flow passages may be unobstructed from the upper end to the lower end. The electronic site may have electronic components mounted to both sides of the flexible substrate, and a portion of the electronic components may be positioned within an air flow passageway.

According to still more detailed aspects, the integrated vehicle structure also preferably includes a metal support structure defining a metal mounting surface. The plastic and metal mounting surfaces preferably exist in planes that are generally parallel, and more preferably which are co-planar. As one example, the metal support structure may be a cross-car beam of a vehicle, while the plastic support structure may be a center stack structure attached to the cross-car beam. The means for attaching the flexible substrate to the plastic mounting surface is preferably designed to permit movement of the flexible substrate relative to the attaching means in order to accommodate the different coefficients of thermal expansion between the metal and plastic structures. In one embodiment, a first electronic site is mounted to the plastic mounting surface while a second electronic site is attached to the metal mounting surface. In another embodiment, a single electronic site having one flexible substrate is mounted to both the plastic mounting surface and the metal mounting surface of the two support structures.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
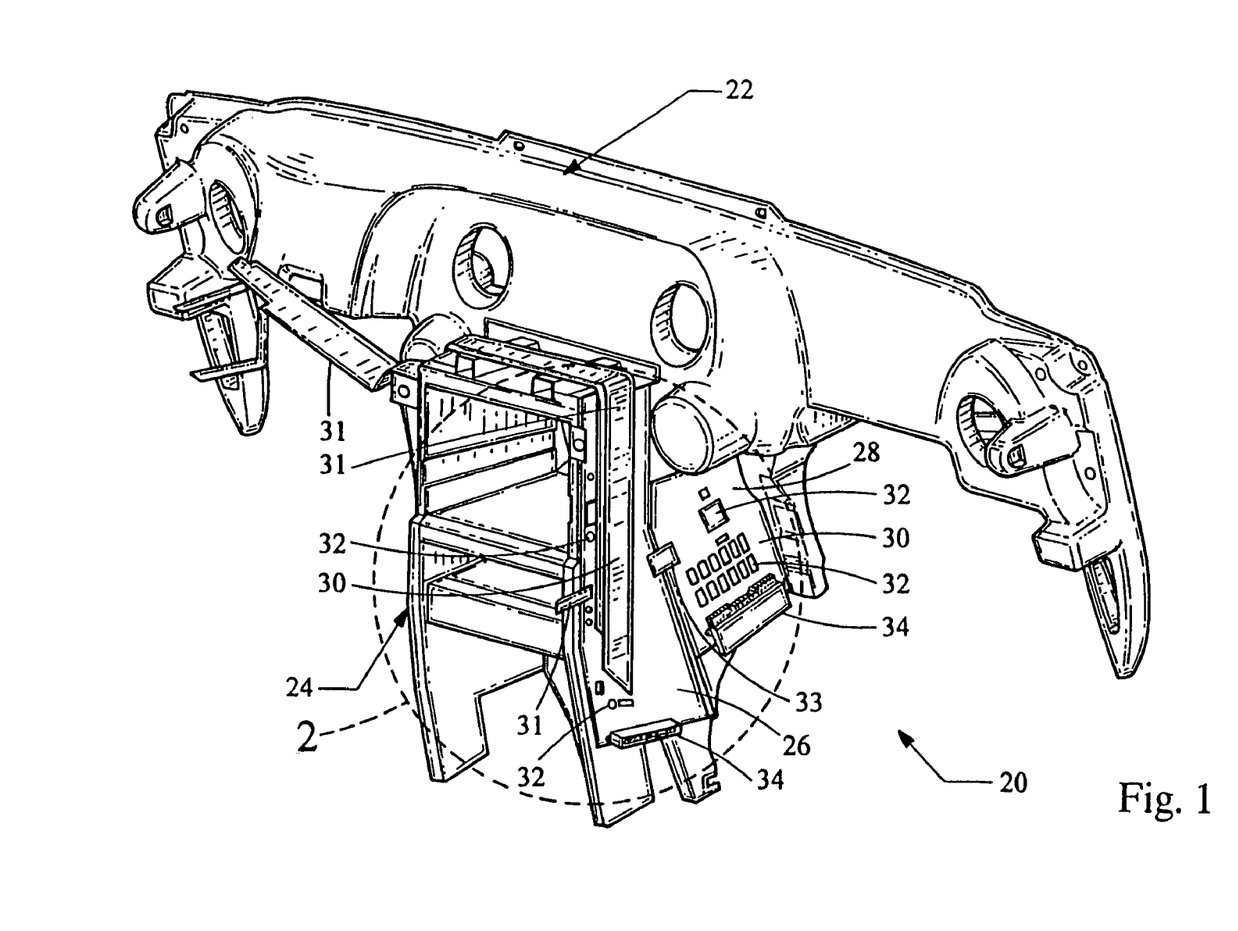
FIG. 1 is a perspective view of an embodiment of the integrated vehicle structure constructed in accordance with the teachings of the present invention.

Turning now the figures, FIG. 1 depicts an integrated vehicle structure 20 constructed in accordance with the teachings of the present invention. The integrated vehicle structure includes a metal support structure 22 which has been depicted as a metal cross-car structure, a well known structure in the art. A plastic support structure 24 is attached to the metal support structure 22, and has been depicted as a plastic center stack, as is also known in the art. The center stack 24 is typically utilized to hold a variety of components, including electronic components, such as radios, navigation systems, and various human machine interfaces (HMI's) for operating the electronic devices of the vehicle. Attached to portions of the metal support structure 22 and the plastic support structure 24, are electronic sites 26, 28. In particular, a first electronic site 26 is attached to the plastic support structure 24, while the second electronic site 28 is attached to the metal support structure 22.

Figure 2:
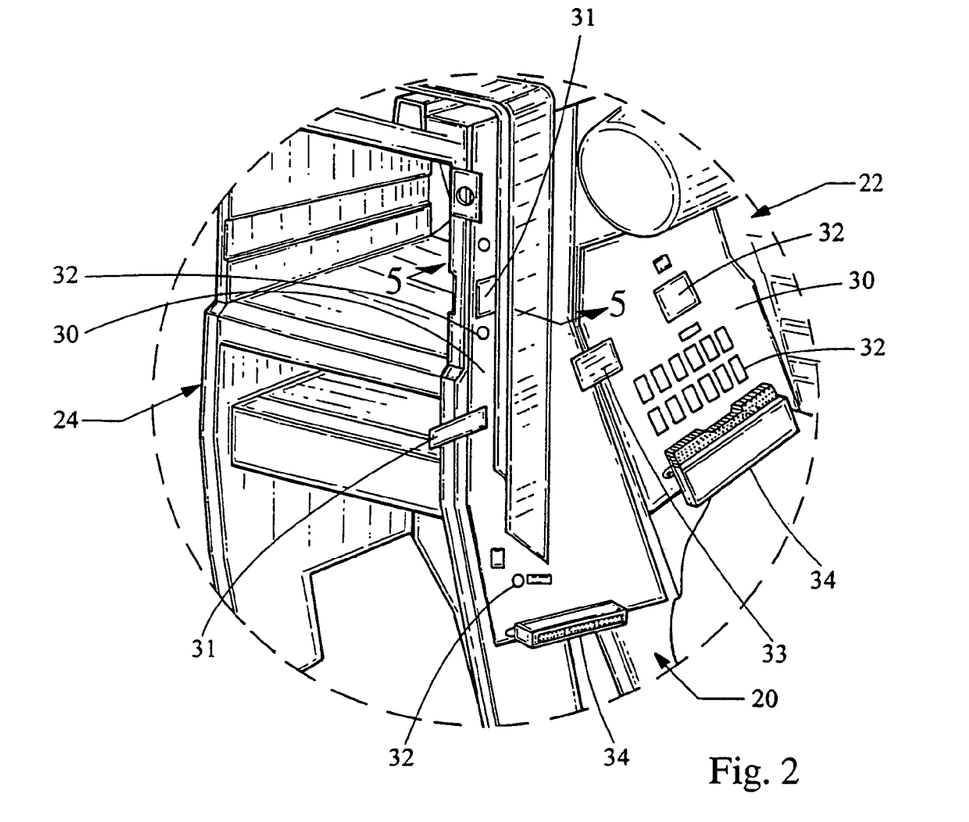
FIG. 2 is an enlarged view, partially cutaway, of FIG. 1.

As best seen in FIGS. 1 and 2, each of the electronic sites 26,28 includes a flexible substrate 30 having various electronic components 32 attached thereto. The electronic components 32 will vary depending on the particular device, but may include processors, microchips, integrated circuits, power drivers, resistors, capacitors, inductors, and the like. The electronic sites 26, 28 also include connectors 34 for interconnecting the sites 26, 28 to other components or to a bussing system or the like. A plurality of flatwire takeouts 31 may also be used to interconnect the electronic sites 26, 28 with other sites or devices within the vehicle, including a bussing system. In fact, one or more of the flatwire takeouts 31 may itself comprise the bussing system for the vehicle electronics. A flexible jumper 33 is used to interconnect the first and second electronic sites 26, 28. The electronic sites 26, 28 can be used to operate another device within the vehicle, or itself can represent a stand-alone device such as a radio.

Preferably, the hotter or higher power electronic components 32 form a portion of the second electronic site 28 which is attached the metal support structure 22, while the lower power electronic components 32 preferably reside on the first electronic site 26 which is attached to the plastic support structure 24. In this way, the electronic components 32 which generate more heat can utilize the metal structure 22 as a heat sink to transfer heat away from the electronic site 28 by way of conductive cooling. At the same time, the lower heat generating components are preferably attached to the plastic support structure 24, which provides convective cooling via the air to the electronic components 32. However, it will be recognized that all of the high power and heat generating components 32 may not be able to be situated on the metal support structure 22, and thus the present invention provides an integrated vehicle structure 22 which improves the cooling of the electronic components 32 found on the plastic support structure 24, as will be discussed below.

Figure 3:
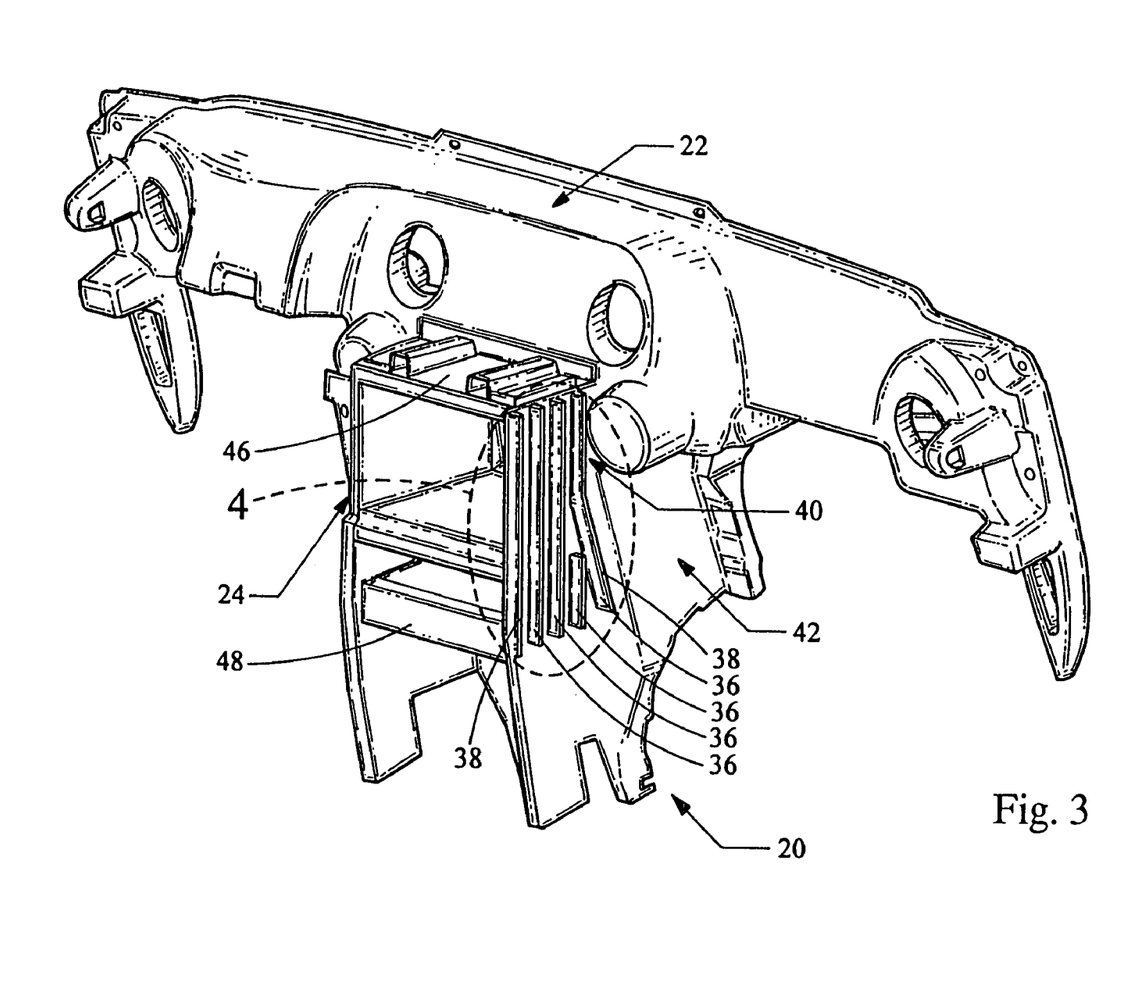
FIG. 3 is a perspective view similar to FIG. 1, but having the electronic sites removed to reveal the mounting surfaces.
Figure 4:
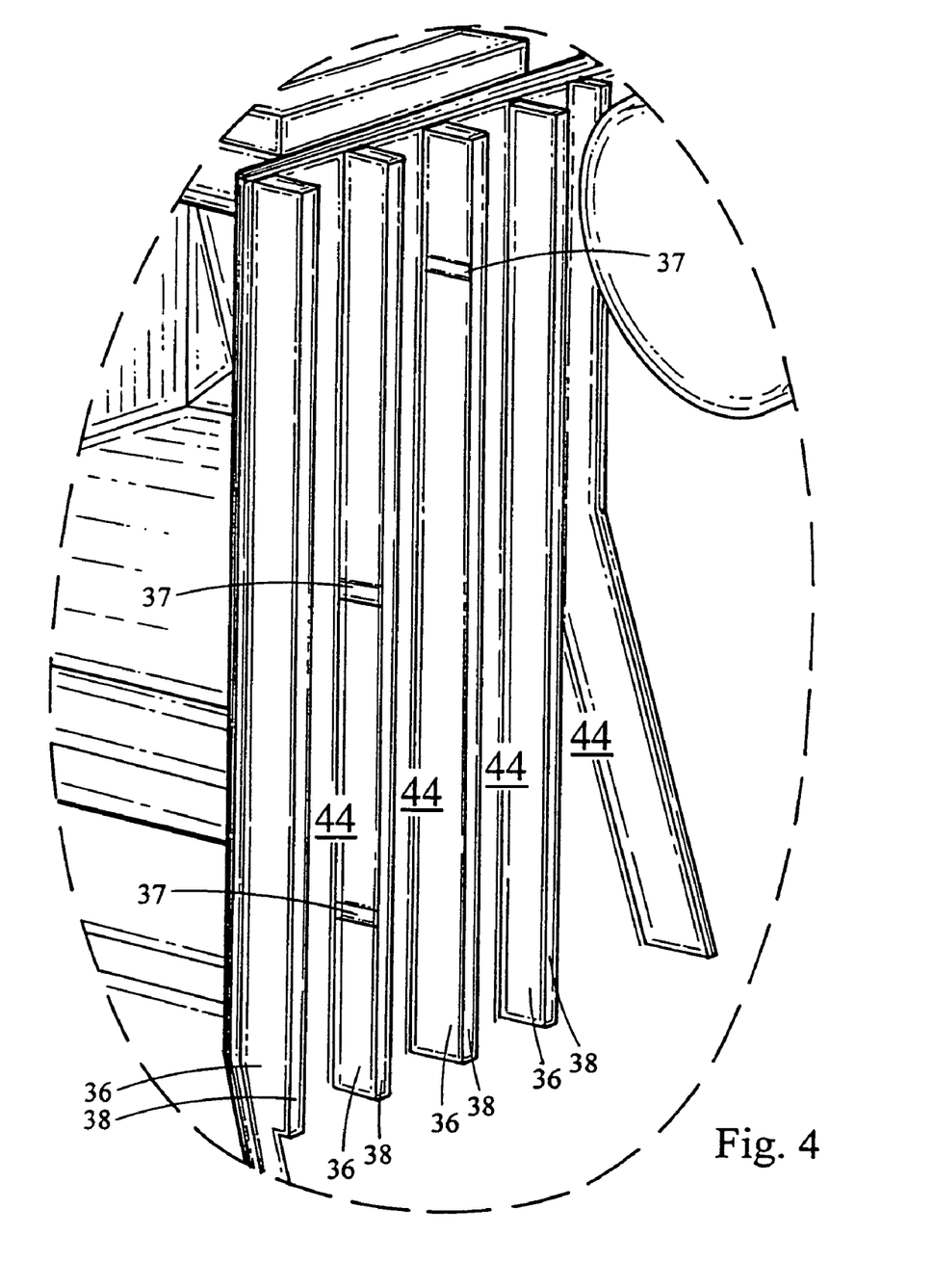
FIG. 4 is an enlarged view, partially cutaway, of FIG. 3.

Turning to FIGS. 3 and 4, the integrated vehicle structure 20 has been shown with the electronic sites 26, 28 removed. Accordingly, it can be seen that the metal support structure 22 is designed with a flat or planar metal mounting surface 42. The metal mounting surface 42 is sized and structured to receive the second electronic site 28 directly thereon. The metal surface 42 could include some holes or slots 250 (FIG. 7) for double side population of the components 32, which rest within such holes or slots. Further, the metal mounting surface 42 can be non-planar with radii, angles or bevels (extending vertically and/or horizontally). The plastic support structure 24 also defines a plastic mounting surface 40 which is sized and structured to receive the first electronic site 26. Since the plastic material of the plastic support structure 24 is not a good conductor of heat, the plastic mounting surface 40 has been designed to provide improved convective cooling to the electronic site 26.

In particular, the plastic support structure 24 has been designed with a plurality of ribs 26 projecting laterally from the plastic support structure 24. Each of the ribs 36 extends vertically from a top portion 46 to a bottom portion 48 of the plastic support structure 24. As best seen in FIG. 4, each of the ribs 36 includes an outer edge 38. The outer edges 38 combine to form the plastic mounting surface 40 for the first electronic site 26. The outer edge surfaces 38 are preferably aligned in a single plane, although the edges 38 may be somewhat misaligned relative to the mounting plane, since the flexible substrate 30 of the electronic site 26 can conform to virtually any contour of the plastic support surface 40. Thus the mounting plane can be non-planar with radii, angles or bevels so that the shape meets the design requirements. It will be recognized that the radii, angles or bevels may be formed vertically or horizontally.

Notably, spaces are left between the vertically extending ribs 36, which in combination with the substrate 30 of the electronic site 26 defines a plurality of air flow passageways 44. More specifically, two adjacent ribs 36 and the substrate 30 which is attached to the outer edge 38 of those adjacent ribs 36, combine to form an air flow passageway 44 extending vertically along the plastic support structure 24. The air flow passageways 44 are preferably as unobstructed as possible, to allow a flow of air upwardly through the passageways 44. In this manner, the electronic components 32 of the electronic site 26 on the plastic support structure 24 are allowed to expel their heat through convective cooling. The ribs 36 are preferably vertically oriented, such that the air flow passageways 44 are also vertically oriented. However, it will be recognized that the ribs 36 may be placed on angles relative to vertical, may be curved in shape, or may have a portion extending horizontally, whereby the air flow passageways 44 will be angled or curved but will generally extend vertically. It will also be recognized that the plastic support structure 22 may define flow holes 252 (FIG. 7) adjacent the flow passageways 44, and similarly the ribs 36 may include flow holes 254 (FIG. 7) extending therethrough to link adjacent flow passageways 44 to improve the flow of air for increased convective cooling. Additionally, metal blocks 256 (FIG. 7) can be positioned in or adjacent the flow passageways 44 by attachment or in-molding to conductively cool very hot components 32 that are located on the plastic area 40.

As best seen in FIG. 4, the plurality of ribs 36 include several bosses 37 for attachment of the electronic site 26. In terms of connecting the electronic sites 26, 28 to the plastic and metal mounting surfaces 40, 42, reference is made to U.S. application Ser. No. 10/292,553 which discloses numerous means for attaching the substrates 30 of the electronic sites 26, 28 to the support structures 22, 24. The bosses 37 on the ribs 36 are preferably structured to correspond with apertures in the flexible substrate 30. The bosses are then deformed to hold the sites 26, 28 in place.

The plastic mounting surface 40 and the metal mounting surface 42 extend in the vertical direction, and preferably are vertically oriented. The air flow passageways 44 extend from the upper end 46 to the lower end 48 of the plastic support structure 24, and in particular the plastic mounting surface 40. Preferably, the plastic mounting surface 40 and the metal mounting surface 42 exists in planes which are parallel, and most preferably which are co-planar. However, the substrates 30 of the electronic sites 26, 28 are flexible in nature, permitting the substrates 30 to accommodate alternately shaped mounting surfaces 40,42 such as curved or undulating surfaces extending vertically and/or horizontally, and as previously discussed.

Figure 5:
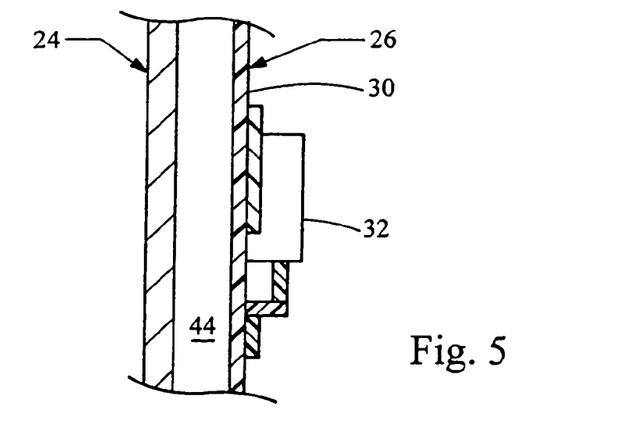
FIG. 5 is a cross-sectional view taken about the line 5—5 in FIG. 2.
Figure 7:
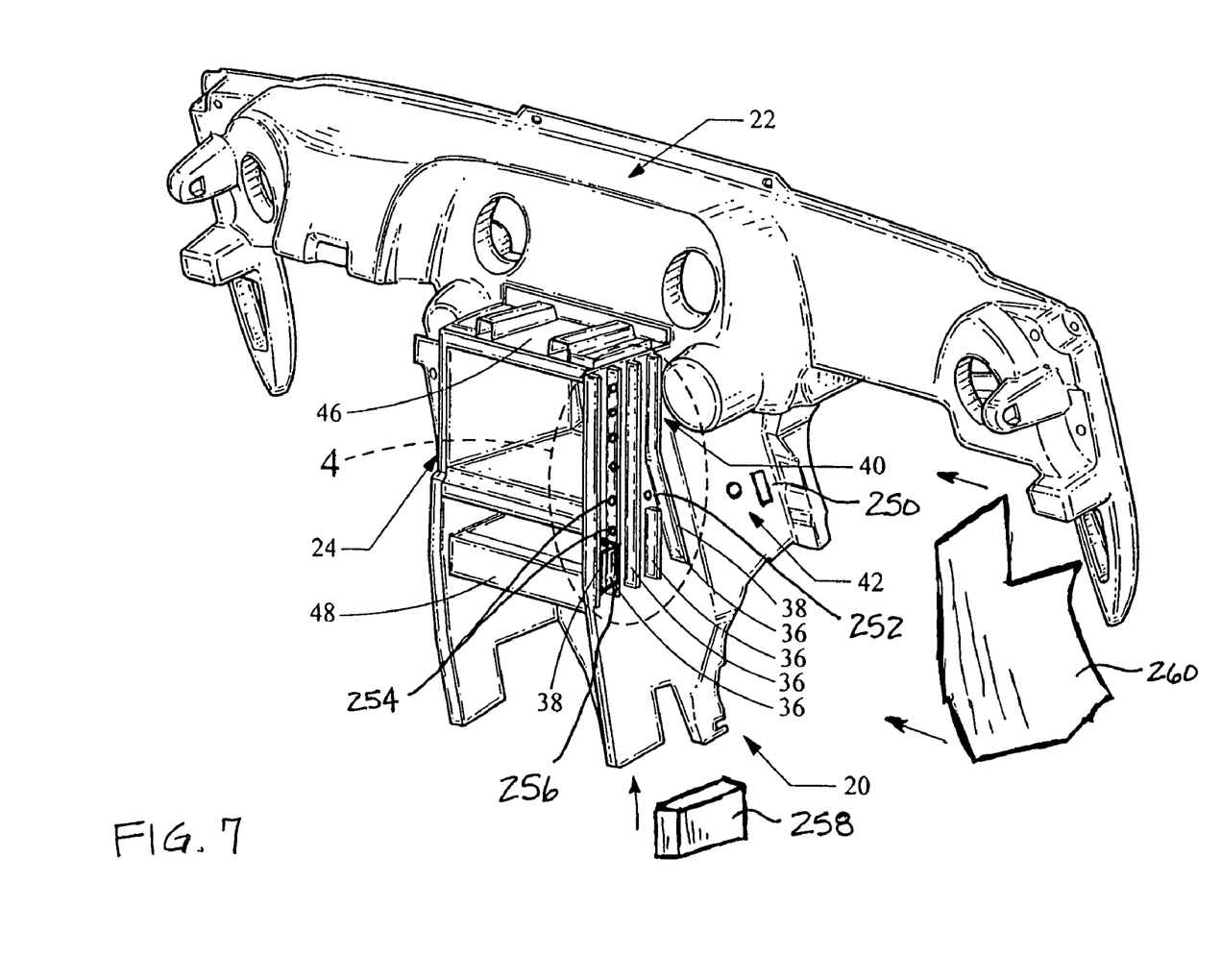
FIG. 7 is a perspective view of yet another embodiment of an integrated vehicle structure constructed in accordance with the teachings of the present invention.

As best seen in the cross-sectional view of FIG. 5, the substrate 30 of the electronic site 26, in combination with the ribs 36 and the body of the plastic support structure 24, define air flow passageways 44 extending vertically. The electronic components 32 are mounted to the substrate 30 and heat therefrom is allowed to dissipate into the air through natural convection in the air flow passageways 44. It will also be recognized that the electronic site 26 may be double-sided, that include electronic components 32 on both sides of the substrate 30. In this case, the electronic components 32 would be positioned within the air flow passageway 44 and allowed to directly cool via the air flowing through the passageway 44. The air flow may be effected by either natural convection or forced convection (where a fan 258 (FIG. 7) is used to force air through the passageways 44). These electronics 26, 28 are then protected by attaching trim panels 260 over them during the cockpit assembly (FIG. 7). Also added protection such as conformal coating or metal EMC covers can be applied.

Figure 6:
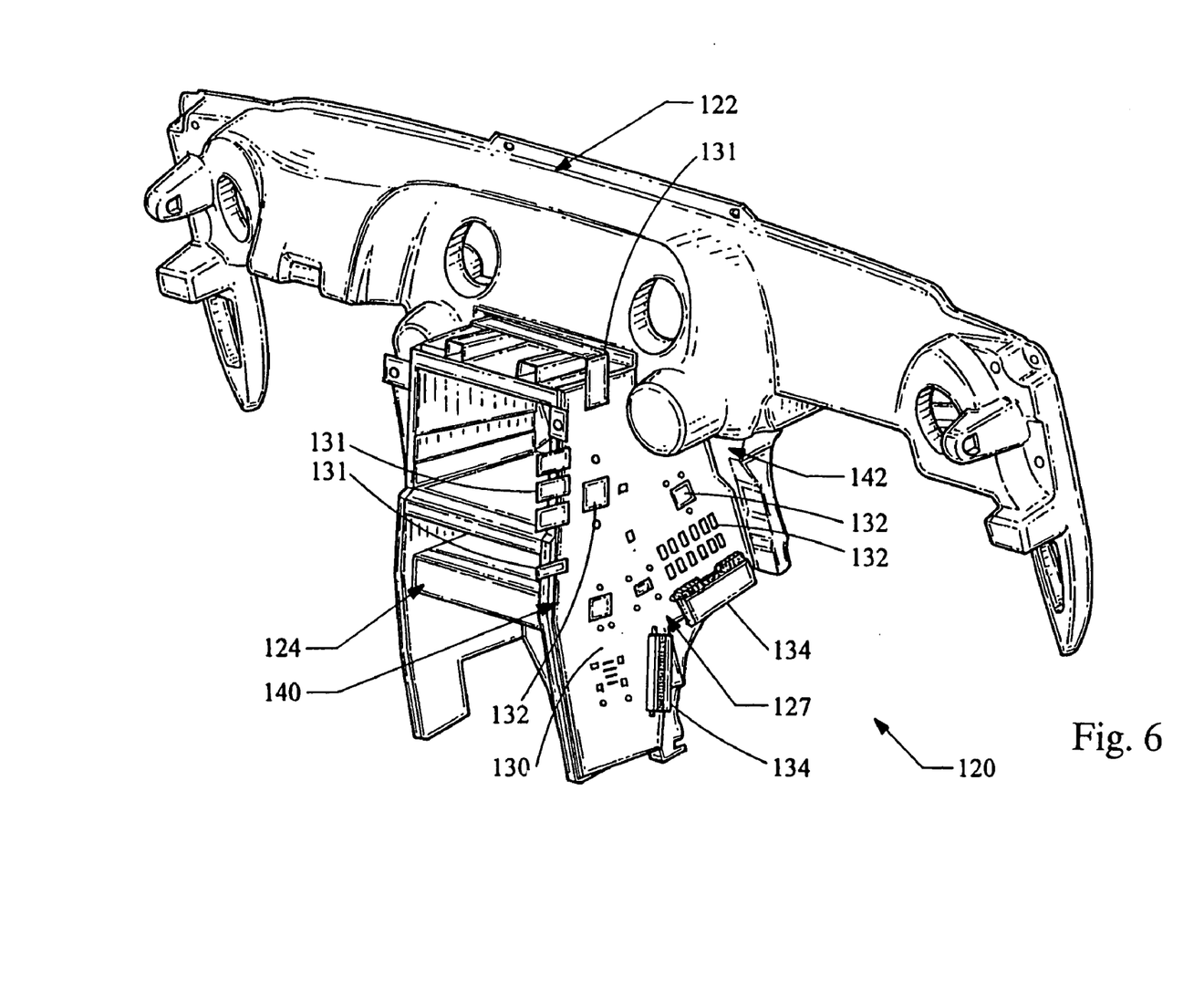
FIG. 6 is a perspective view of another embodiment of an integrated vehicle structure constructed in accordance with the teachings of the present invention.

An alternate embodiment of the integrated vehicle structure 120 has been depicted in FIG. 6. In this figure, the metal support structure 122 is a cross-car beam defining a vertical metal mounting surface 144, as in the prior embodiment. Likewise, the plastic support structure 124 is a center stack structure defining a plastic mounting surface 140. However, this embodiment of the integrated vehicle structure 120 includes a single electronic site 127. The electronic site 127 includes a substrate 130 that is flexible in nature, and which has a plurality of electronic components 132 and connectors 134 mounted thereon. Similarly, a plurality of flatwire takeouts 131 interconnect the electronic site 127 to other components or other electronic sites within the vehicle.

In this way, the single electronic site 127 is supported on both the plastic mounting surface 140 and the metal mounting surface 142. Nonetheless, the plastic mounting surface 140 is still defined by a plurality of ribs which define air flow passageways therebetween (not shown) as was described in the prior embodiment.

It will also be recognized that the metal support structure 122 has a different coefficient of thermal expansion (CTE) than the plastic support structure 124. Thus, the two support structures 122, 124 will expand and contract differently in response to changes in temperature. Accordingly, the attachment means are preferably designed to permit movement of the flexible substrate 130 relative to the attaching means to accommodate the different CTE's. For example, compression clips as previously disclosed are ideally suited for this purpose. Further, when the attachment means includes apertures formed in the flexible substrate 130 through which any of various structures such as bosses 37, screws, pins, etc., the holes are preferably oversized or slotted relative to the diameter of the male counterpart, and most preferably oversized by about 5% to 75% in diameter or 5% to 30% for a slot. In this way, the flexible substrate 130 and hence the electronic site 127 is permitted to move relative to the attachment means, and also relative to the plastic and metal mounting surfaces 140,142.

Accordingly, the present invention provides an integrated vehicle structure that is easy to assemble and minimizes the size and weight of the entire system, by eliminating the heavy and complex wire harnesses and large metal box support structures as have been used heretofore. Further, the integrated vehicle structure includes both metal and plastic support structures which provide adequate space, mechanical support and thermal cooling of the electronic sites and their components. In particular, the plastic support structure is constructed of a plurality of ribs defining air flow passageways to increase the convective cooling of the electronic components. Further, reliable attachment methods and means are provided which not only provide ease of assembly and are lightweight, but which also allow movement of the flexible substrate of the electronic site such that the site can accommodate the different CTE's of the plastic and metal structures. In some, the integrated vehicle structure of the present invention provides reliable attachment mechanical support and excellent thermal cooling of electronic components mounted within a vehicle, while minimizing the required space to allow even more electronics to be provided on and within the vehicle.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An integrated vehicle structure comprising:
    an electronic site having a flexible substrate with electronic components mounted on the flexible substrate;
    a plastic support structure defining a plastic mounting surface, the plastic support structure including a plurality of elongated ribs projecting from the plastic support structure and extending along side each other, each of the ribs having a side edge forming a portion of the plastic mounting surface;
    the flexible substrate being mounted to the plastic mounting surface; and
    a plurality of air flow passageways defined by adjacent ribs and the flexible substrate mounted to the adjacent ribs, the plurality of air flow passageways extending along the plastic support structure to provide convective cooling to the electronic components of the electronic site.

2. The integrated vehicle structure of claim 1, wherein the plastic mounting surface is vertically oriented.

3. The integrated vehicle structure of claim 2, wherein the air flow passageways extend vertically.

4. The integrated vehicle structure of claim 2, wherein the ribs and air flow passageways extend from an upper end of the plastic mounting surface to a lower end of the plastic mounting surface.

5. The integrated vehicle structure of claim 4, wherein the air flow passageways are unobstructed from the upper end to the lower end.

6. The integrated vehicle structure of claim 1, wherein the electronic site has electronic components mounted to both sides of the flexible substrate, and wherein a portion of the electronic components are positioned within one of the plurality of air flow passageways.

7. The integrated vehicle structure of claim 1, wherein the plastic mounting surface is non-planar.

8. The integrated vehicle structure of claim 1, further comprising metal blocks positioned in at least one flow passageway to conductively cool an electronic component.

9. The integrated vehicle structure of claim 1, further comprising a fan providing forced convection in the flow passageways.

10. The integrated vehicle structure of claim 1, further comprising a cover positioned over plastic support structure to protect the electronic site.

11. The integrated vehicle structure of claim 1, further comprising a metal support structure defining a metal mounting surface.

12. The integrated vehicle structure of claim 11, wherein the metal mounting surface is non-planar.

13. The integrated vehicle structure of claim 11, wherein the metal mounting surface exists in a first plane and the plastic mounting surface exists in a second plane, the first and second planes being generally parallel.

14. The integrated vehicle structure of claim 11, wherein the two mounting surfaces are co-planar.

15. The integrated vehicle structure of claim 11, further comprising means for attaching the flexible substrate to the plastic mounting surface, and wherein the attaching means permits movement of the flexible substrate relative to the attaching means to accommodate different coefficients of thermal expansion between the plastic support structure and the metal support structure.

16. The integrated vehicle structure of claim 11, further comprising a second electronic site having a second flexible substrate with second electronic components mounted to the second flexible substrate, the second electronic site connected to the metal mounting surface.

17. The integrated vehicle structure of claim 16, wherein the metal mounting surface is flat and the second electronic site is single-sided.

18. The integrated vehicle structure of claim 16, wherein the metal mounting surface defines a hole and the second electronic site is double side populated, the hole receiving an electronic component.

19. The integrated vehicle structure of claim 16, wherein the first and second electronic sites are electronically connected by a flexible jumper.

20. The integrated vehicle structure of claim 16, wherein the metal support structure is a cross car structure of a vehicle.

21. The integrated vehicle structure of claim 11, wherein the flexible substrate of the electronic site is also mounted to the metal mounting surface of the metal support structure.

22. An integrated vehicle structure comprising:
an electronic site having a flexible substrate with electronic components mounted to the flexible substrate;
a metal support structure defining a metal mounting surface existing in a first plane;
a plastic support structure defining a plastic mounting surface existing in a second plane, the plastic support structure including a plurality of elongated ribs projecting from the plastic support structure and extending along side each other, each of the ribs having a side edge forming a portion of the plastic mounting surface; and
the flexible substrate being mounted to both the plastic mounting surface and the metal mounting surface.

23. The integrated vehicle structure of claim 22, further comprising a plurality of air flow passageways defined by adjacent ribs and the flexible substrate mounted to the adjacent ribs, the plurality of air flow passageways extending along the plastic support structure to provide convective cooling to the electronic components of the electronic site.

24. The integrated vehicle structure of claim 23, wherein the ribs and air flow passageways extend from an upper end of the plastic mounting surface to a lower end of the plastic mounting surface.

25. The integrated vehicle structure of claim 24, wherein the air flow passageways are unobstructed from the upper end to the lower end.

26. The integrated vehicle structure of claim 23, wherein at least one rib includes an aperture linking adjacent air flow passageways.

27. The integrated vehicle structure of claim 22, wherein the first and second planes are generally parallel.

28. The integrated vehicle structure of claim 22, wherein the first and second mounting surfaces are co-planar.

29. The integrated vehicle structure of claim 22, further comprising means for attaching the flexible substrate to the plastic mounting surface, and wherein the attaching means permits movement of the flexible substrate relative to the attaching means to accommodate different coefficients of thermal expansion between the plastic support structure and the metal support structure.

30. The integrated vehicle structure of claim 22, wherein the metal support structure is a cross car structure of a vehicle.

31. The integrated vehicle structure of claim 22, wherein the plastic support structure is a center stack structure.

* * * * *